(No Model.)
A. P. MERRILL.
DRIVE CHAIN.
No. 455,226. Patented June 30, 1891.
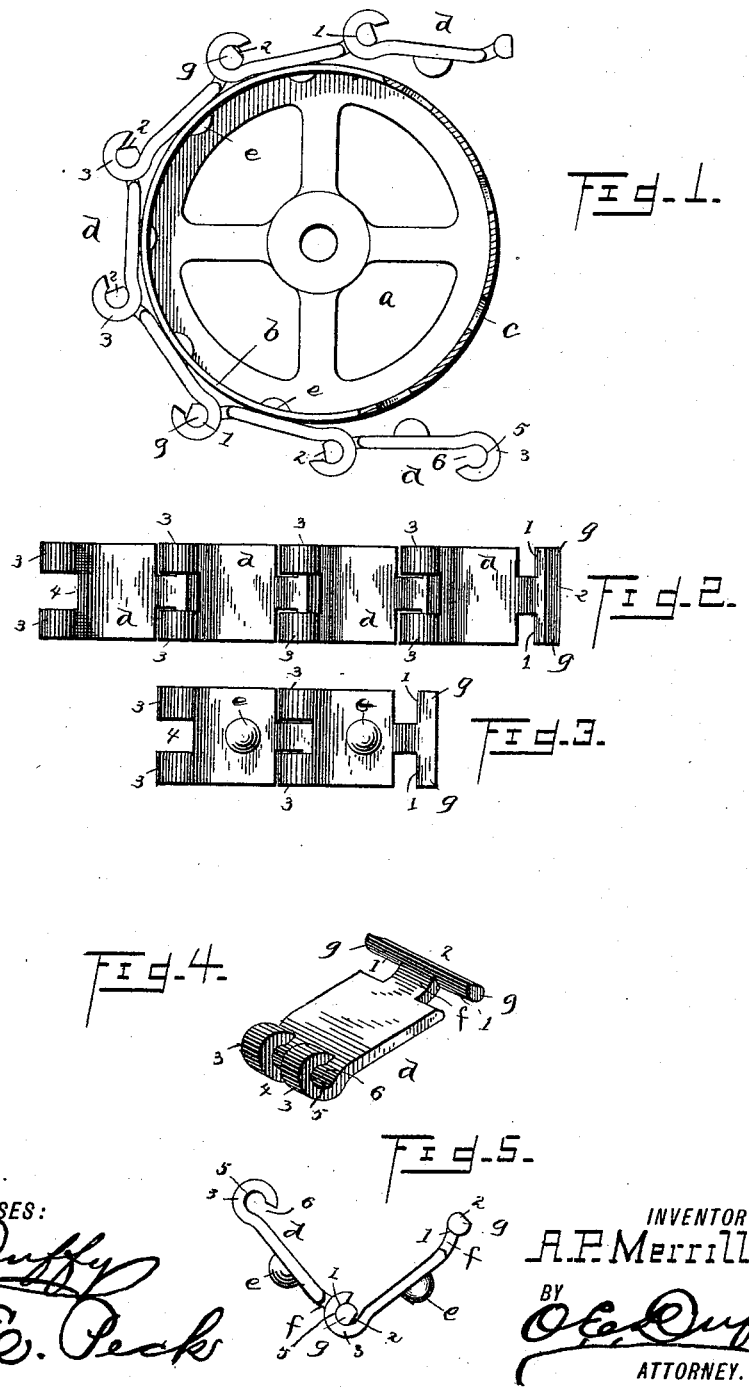
WITNESSES:
INVENTOR
A. P. Merrill
BY
ATTORNEY.

UNITED STATES PATENT OFFICE.

ANSON P. MERRILL, OF FALL RIVER, MASSACHUSETTS, ASSIGNOR OF ONE-HALF TO CHARLES A. HICKS, OF SAME PLACE.

DRIVE-CHAIN.

SPECIFICATION forming part of Letters Patent No. 455,226, dated June 30, 1891.

Application filed November 17, 1890. Serial No. 371,700. (No model.)

*To all whom it may concern:*

Be it known that I, ANSON P. MERRILL, of Fall River, in the county of Bristol and State of Massachusetts, have invented certain new and useful Improvements in Drive-Chains; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in drive-chains.

The object of the invention is to provide an improved drive-chain exceedingly strong, durable, and simple in construction and noiseless and not liable to slip or kink and wherein the links are united by detachable joints.

These objects are accomplished by and this invention consists in certain novel features of construction and in combinations of parts more fully described hereinafter, and particularly pointed out in the claims.

Referring to the accompanying drawings, Figure 1 is an edge view of a section of a chain, a wheel adapted for use with this chain being shown partially in section. Figs. 2 and 3 are respectively a top and bottom plan of a section of the chain. Fig. 4 is a detail perspective of the link. Fig. 5 is an edge view of two links, showing them turned up into position to be detached from each other.

In the drawings, $a$ indicates a wheel having an inturned annular flange $b$, provided with the transverse similar apertures $c$, extending completely through the flange and located an equal distance apart.

The chain is composed of the links $d$, each link being formed integral and composed of the solid flat metal body provided on its inner face with the centrally-located stud, lug, or sprocket $e$, formed integral with the link and preferably semi-spherical in shape. The apertures $c$ are formed to receive and correspond to these sprockets $e$. One end of each link has the neck $f$ extending centrally therefrom with a slight upward inclination and having the cross-bar or journals $g\ g$ integral therewith and extending laterally parallel with the edge of the link-body. The inner longitudinal sides 1 1 of said journals are rounded, as shown, to form the bearing-surfaces, said surfaces being preferably rounded from the same center. The outer sides 2 2 of the journals are flattened, as shown, so as to form the journals somewhat elliptical in cross-section. The opposite end of the link is provided with the two similar parallel hooks 3 3, extending out from opposite sides of the end of the link, leaving a space 4 between them sufficient to receive the neck $f$, as shown. These hooks are closed on the under side and turn up on the upper side and extend back, so as to open on the upper surface of the link. The inner bearing-surfaces 5 of the hooks are rounded to form bearings, and the inner opening forms more than one-half of a circle, so that a completely round bar fitted in said bearing could not be removed therefrom through the opening 6 of the hook. The journals $g\ g$ are formed to snugly fit and turn in said bearings formed by hooks 3, so that the links cannot be separated when they lie substantially parallel with each other or have their inner faces bent in toward each other, as shown in Figs. 1, 2, and 3, for when in these positions the flat sides 2 of the journals are substantially opposite the contracted openings 6 of the hooks. When it is desired to separate the links, they should be swung up so that their outer faces approach each other, and when the two links are substantially at right angles to each other the journals can be slipped from hooks 3 out through openings 6, as is clearly obvious, and over the top face of the link or in the longitudinal line of the link. Each link is formed in any suitable manner, preferably entirely integral.

This invention bears no resemblance to and I do not herein claim a cog-link drive-chain—that is, a chain having a closely-arranged series of cogs or ribs extending completely across the inner faces of the links from end to end and meshing with a corresponding series of cogs on the wheel—nor do I claim a chain composed of a series of hollow metal balls loosely connected by bolts, nor does such a chain at all resemble my peculiar construction. As the apertures $c$ are open at both ends, they cannot clog up with dirt, &c.

This chain, while being adapted for many uses, is particularly adapted for use on Safety bicycles.

This chain reduces wearing-points and surfaces, and hence the friction is a minimum. No lubrication is required. Hence the chain does not clog and gum up with dirt and soil the clothing. It is almost noiseless, and there is no "backlash," nor does the chain "kink."

What I claim is—

1. A drive-chain composed of detachable links, each link composed of the body having an open hook or bearing-socket at one end and a bearing bar or journal at the other end, the bearing-surface of the hook being circular and the bar or journal elliptical in cross-section, the opening into the hook or socket being greater in width than the shortest diameter of the bar, but less than the longest diameter of said bar, as and for the purposes set forth.

2. The herein-described drive-chain, composed of links, each link being integral and having a neck projecting from one end with an upward inclination, the lateral journals from the ends of said neck curved or rounded on their inner sides to form bearing-surfaces and flattened on their outer sides, the other end of the link having the two separated open hooks projecting therefrom provided with the rounded bearings, the opening into the same being greater than the smallest and less than the greatest diameter of said journals.

3. The drive-chain composed of the herein-described pivotally-united links, each link consisting of a flat solid metal plate having the single rounded lug on its under side and integral therewith and centrally located between the sides and ends thereof, as set forth.

In testimony that I claim the foregoing as my own I affix my signature in presence of two witnesses.

ANSON P. MERRILL.

Witnesses:
C. F. LA BOUTÁ,
LOUIS GIRARDIN.